United States Patent
Tseng et al.

(10) Patent No.: US 9,473,311 B2
(45) Date of Patent: Oct. 18, 2016

(54) METHOD AND DEVICE FOR MANAGING CERTIFICATES

(71) Applicant: INDUSTRIAL TECHNOLOGY RESEARCH INSTITUTE, Hsinchu (TW)

(72) Inventors: Huei-Ru Tseng, New Taipei (TW); Pei-Chuan Tsai, Hsinchu County (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 14/606,585

(22) Filed: Jan. 27, 2015

(65) Prior Publication Data
US 2015/0256346 A1    Sep. 10, 2015

(30) Foreign Application Priority Data

Mar. 5, 2014 (TW) .............................. 103107517 A

(51) Int. Cl.
   H04L 29/06 (2006.01)
   H04L 9/32 (2006.01)
   H04L 9/08 (2006.01)

(52) U.S. Cl.
   CPC ........... *H04L 9/3268* (2013.01); *H04L 9/0861* (2013.01); *H04L 9/3236* (2013.01); *H04L 9/3265* (2013.01); *H04L 63/0823* (2013.01)

(58) Field of Classification Search
   CPC .................................................... H04L 9/3268
   USPC ....................................................... 713/158
   See application file for complete search history.

(56) References Cited

U.S. PATENT DOCUMENTS

| | | | |
|---|---|---|---|
| 5,903,651 A | * | 5/1999 | Kocher ................. H04L 9/3236 713/158 |
| 6,097,811 A | | 8/2000 | Micali |
| 6,397,329 B1 | | 5/2002 | Aiello et al. |
| 7,257,711 B2 | | 8/2007 | Goodrich et al. |
| 8,171,283 B2 | | 5/2012 | Pietrowicz et al. |

(Continued)

FOREIGN PATENT DOCUMENTS

| | | |
|---|---|---|
| CN | 1666460 A | 9/2005 |
| WO | 2006026737 A2 | 3/2006 |

OTHER PUBLICATIONS

Jason J. Haas et al., Design and analysis of a lightweight certificate revocation mechanism for VANET, VANET"09, 2009, 89-98.

(Continued)

*Primary Examiner* — Peter Shaw
(74) *Attorney, Agent, or Firm* — Locke Lord LLP; Tim Tingkang Xia, Esq.

(57) ABSTRACT

A certificate management method and a certificate management device are disclosed. The certificate management device includes a key collection computing unit, a certificate revocation unit, and a certificate revocation list broadcast unit. The certificate management method includes determining to at least revoke a first certificate in certificates that are recorded in a key tree and related to an entity, and determining whether a first root node only covers the first certificate and other revoked certificate in the key tree. When the first root node only covers the first certificate and the other revoked certificate, information about the first root node is added to a certificate revocation list. The certificate revocation list is sent to another entity at least.

12 Claims, 4 Drawing Sheets

(56) References Cited

U.S. PATENT DOCUMENTS

| | | |
|---|---|---|
| 8,230,215 B2 | 7/2012 | Laberteaux et al. |
| 8,321,664 B2 | 11/2012 | Gentry et al. |
| 2003/0217265 A1* | 11/2003 | Nakano ............ G11B 20/00086 713/158 |
| 2008/0133907 A1 | 6/2008 | Parkinson |
| 2014/0289512 A1 | 9/2014 | Tseng et al. |

OTHER PUBLICATIONS

Ahren Studer et al., Tacking together efficient authentication, revocation, and privacy in VANETs, IEEE, 2009.

Rongxing Lu et al., ECPP: Efficient conditional privacy preservation protocol for secure vehicular communications, IEEE, 2008, 1903-1911.

Kenneth P. Laberteaux et al., Security certificate revocation list distribution for VANET, VANET"08, 2008, 88-89.

Panagiotis (PANOS) Papadimitratos et al., Certificate revocation list distribution in vehicular communication systems, VANET"08, 2008, 86-87.

Claude Crépeau et al., A certificate revocation scheme for wireless ad hoc networks, Proceedings of the 1st ACM Workshop Security of Ad Hoc and Sensor Networks Fairfax, 2003, 54-61.

Kocher, On certificate revocation and validation, vol. 1465 of the series Lecture Notes in Computer Science, pp. 172-177, 2006.

European Patent Office, "Office Action", Jul. 27, 2015, Germany.

* cited by examiner

METHOD AND DEVICE FOR MANAGING CERTIFICATES

CROSS-REFERENCE TO RELATED APPLICATIONS

This non-provisional application claims priority under 35 U.S.C. §119(a) on Patent Application No(s). 103107517 filed in Taiwan, R.O.C. on Mar. 5, 2014, the entire contents of which are hereby incorporated by reference.

TECHNICAL FIELD

The disclosure relates to a method and a device for managing certificates.

BACKGROUND

Under a public key code system, an entity confirms the reliability of information through utilizing a certificate from a certificate authority. The entity attaches the certificate to the information and sends them to another entity.

If a private key of an entity is exposed, or an entity malfunctions, or the access authority of an entity is revoked, the certificate authority needs to revoke the certificate before the certificate expires. To revoke the certificate, the certificate authority utilizes a certificate revocation list (CRL) including a value of the certificate to be revoked and provides the certificate revocation list to the entity, whereby the certificate can be verified.

In some networks, for example, a vehicular network, the certificate authority produces ten millions of certificates to the entity, and the entity can switch the in-use certificate at a frequent basis. Therefore, the privacy and identifiability of the entity can be protected. In such networks, the certificate revocation list needs to list the ten millions of certificates to the entity when a certificate of the entity needs to be revoked. Therefore, the certificate revocation list becomes long and results in a procedural burden to the entity.

SUMMARY

According to one or more embodiments, the disclosure provides a certificate management method. The certificate management method may include the following steps. First, at least a first certificate may be determined to be revoked. All certificates including the at least one first certificate recorded in a key tree may be related to an entity. Then, whether a first root node only covers the at least one first certificate and other revoked certificate in the key tree may be determined. When the first root node only covers the at least one first certificate and other revoked certificate, information about the first root node may be added into a certificate revocation list. Finally, the certificate revocation list may be sent to at least other entity.

According to one or more embodiments, the disclosure provides a certificate management device. In one embodiment, the certificate management device may include a key collection computing unit, a certificate revocation unit, and a certificate revocation list broadcast unit. The key collection computing unit may maintain a key tree, and all certificates recorded in the key tree may be related to an entity. The certificate revocation unit may couple with the key collection computing unit, receive a certificate revocation request for at least a first certificate in the key tree, and determine whether a first root node only covers the at least first certificate and other revoked certificate in the key tree. When the first root node only covers the at least one first certificate and the other revoked certificate, information about the first root node may be added into a certificate revocation list. The certificate revocation list broadcast unit may couple with the certificate revocation unit and send the certificate revocation list to another entity.

BRIEF DESCRIPTION OF THE DRAWINGS

The present disclosure will become more fully understood of the detailed description given herein below for illustration only and thus does not limit the present disclosure, wherein.

DETAILED DESCRIPTION

Figure 1:
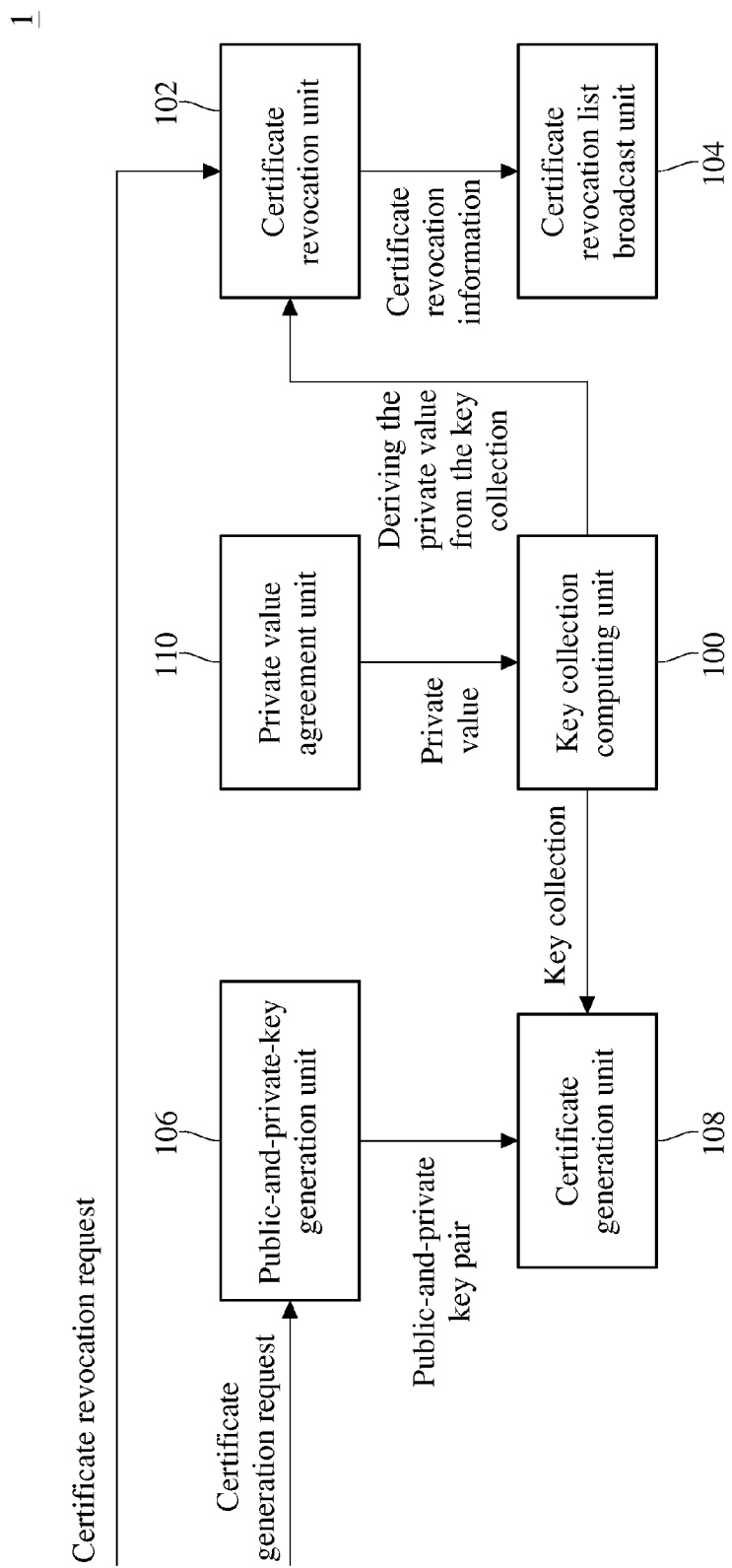
FIG. 1 is a block diagram of a certificate management device according to an embodiment of the disclosure.

In the following detailed description, for purposes of explanation, numerous specific details are set forth in order to provide a thorough understanding of the disclosure embodiments. It will be apparent, however, that one or more embodiments may be practiced without these specific details. In other instances, well-known structures and devices are schematically shown in order to simplify the drawing. Elements which are similar or equal to each other are identified with the same label in the disclosure.

FIG. 1 is a block diagram of a certificate management device according to an embodiment of the disclosure. A certificate management device 1, as shown in FIG. 1, may at least include a key collection computing unit 100, a certificate revocation unit 102, and a certificate revocation list broadcast unit 104, thereby managing and updating a certificate revocation list.

In this or some embodiments, the certificate management device 1 may further include a public-and-private-key generation unit 106, a certificate generation unit 108, and a private value agreement unit 110, thereby performing more functions. Moreover, any one of the public-and-private-key generation unit 106, the certificate generation unit 108 and the private value agreement unit 110 may selectively disposed in the certificate management device 1 by a user who has ordinary skills in the art. In practice, the certificate management device 1 may be a certificate authority.

In order to clearly describe the process of certificate management and the relative device thereof, the disclosure may demonstrate an exemplary embodiment to produce a key tree and certificates, and then demonstrate an exemplary embodiment for the certificate management.

In some embodiments, the certificate management device 1 may receive a certificate generation request from an entity. Then, the public-and-private-key generation unit 106 may produce public-and-private key pairs for the entity sending out the certificate generation request and transmit the public-and-private key pairs to the certificate generation unit 108. Therefore, the private value agreement unit 110 may determine a private value related to the certificate management device 1 and the entity. In this embodiment, the private value may be symbolized by K. After the private value agreement unit 110 may send the private value K to the key collection computing unit 100, the key collection computing unit 100 may establish a key tree related to the private value K and provide the certificate generation unit 108 with the key tree for reference. Therefore, the certificate generation unit 108 may authorize one or more certificates to the entity.

Next, the certificate generation unit 108 may utilize the public-and-private key pairs and the above key tree to produce the one or more certificates for the entity. In one or more exemplary embodiments, the certificate may include a derived key of a leaf node of the key tree, a node index, the mentioned public key of the entity, and a signature for the certificate management device 1.

Then, the certificate management device 1 may send a series of the certificates to the entity, thereby ensuring and confirming purposes of the above information. Only the certificate management device 1 and the above entity may be able to obtain the identification information hided in these certificates, other entities except the certificate management device 1 and the above entity may not be able to join/integrate these certificates together and track the identification information about the above entity according to these certificates.

In one embodiment, the certificate management device 1 may receive a command for revoking one or more entities' unexpired certificates to produce one or more certificate revocation requests and may provide the certificate revocation unit 102 with the one or more certificate revocation requests. The certificate revocation unit 102 may determine one or more certificates to be revoked, and the key collection computing unit 100 may determine the location of certificate to be revoked in the key tree. The certificate revocation unit 102 may, through the key tree maintained by the key collection computing unit 100, collect one or more certificates to be revoked and one or more revoked certificates, and record or add them into a certificate revocation list for updating. Next, the certificate revocation unit 102 may provide the updated certificate revocation list to the certificate revocation list broadcast unit 104 such that the certificate revocation list broadcast unit 104 may periodically send the certificate revocation list to one or more entities in a network. In this way, the one or more entities may determine whether a received certificate is revoked or not, in response to the certificate revocation list.

Figure 2:
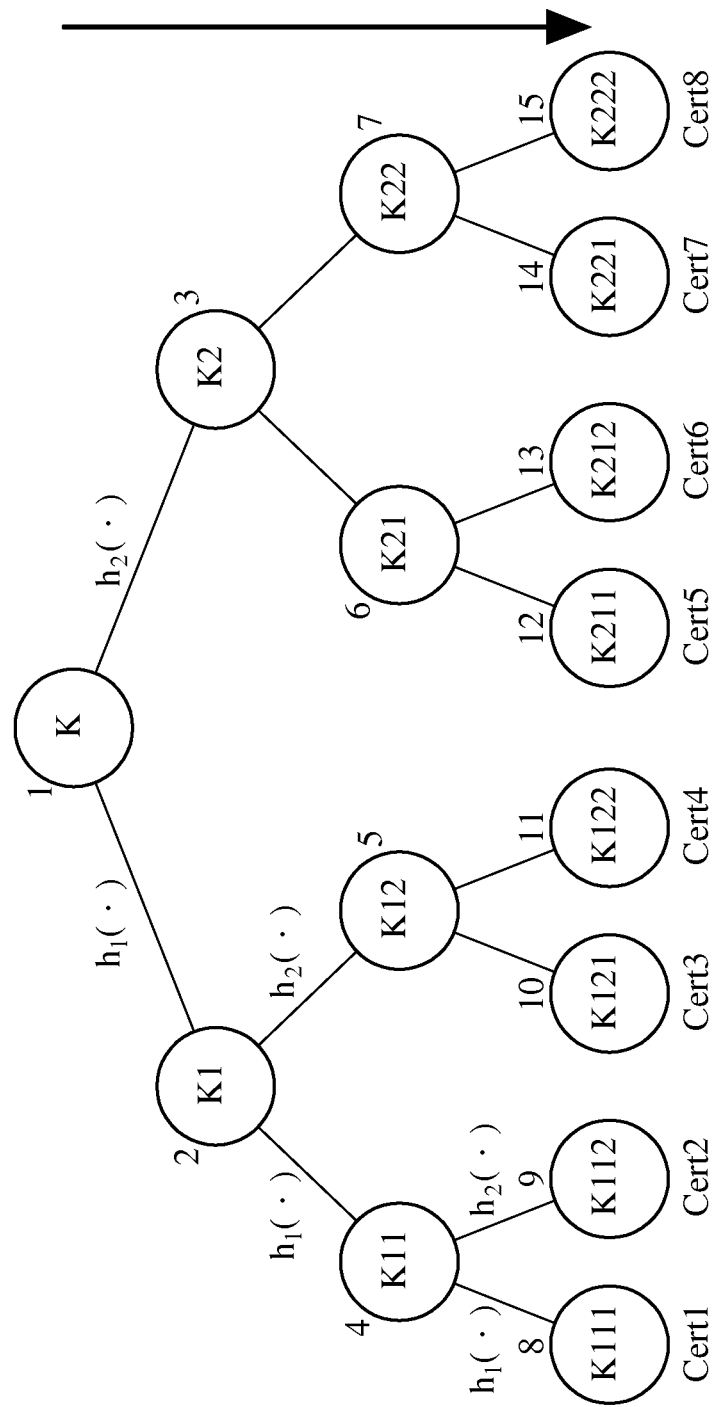
FIG. 2 is a schematic diagram of a key tree according to an embodiment of the disclosure.

FIG. 2 is a schematic diagram of a key tree according to an embodiment of the disclosure. The certificate management device 1 and an entity may communicate with each other to determine a private value K for generating a certificate. Then, the certificate management device 1 may perform some operations to establish a key tree whose root node has a private value K. During the process of generating certificates, the certificate authority may be able to use a derived key of a leaf node in the key tree.

In one or more exemplary embodiments, the certificate authority may use two one-way hash functions to one or more child nodes of each parent node to establish a binary key tree. In one exemplary embodiment, the certificate management device 1 may substitute the value of the parent node into a first one-way hash function to produce a child node at the left side of the parent node, and may substitute the value of the parent node into a second one-way hash function to produce a son node at the right side of the parent node. In other exemplary embodiment, more than two one-way hash functions may be utilized to establish other type key trees. In one exemplary embodiment, three one-way hash functions may be utilized to produce child nodes of each parent node to establish a ternary key tree. In one exemplary embodiment, n pieces of one-way hash functions may be utilized to produce child nodes of each parent node to establish a N-ary key tree, where N is a natural number.

In the case shown in FIG. 2, the certificate management device 1 may use eight certificates following the root node 1 corresponding to the private value K to establish the key tree. The root node 1 may be the root node covering the most root node levels (as referred as the largest root node hierarchy). Then, the private value K (or referred as a root value) may be substituted into a first one-way hash function h1 ( ) to calculate a derived value K1 for a left child node 2, and the private value K may also be substituted into a second one-way hash function h2 ( ) to calculate a derived value K2 for a right child node 3. The root nodes 2 and 3 may cover two root node levels.

Further, the value K1 of the node 2 may be substituted into the first one-way hash function h1 ( ) to calculate a derived value K11 for a left child node 4 of the node 2, and the value K1 of the node 2 may be substituted into the second one-way hash function h2 ( ) to calculate a derived value K12 for a right child node 5 of the node 2. The nodes 4 and 5 may cover a single root node level. Therefore, for a person who has ordinary skills in the art, the node 2 may be a root node of the nodes 4 and 5, and the nodes 4 and 5 may be leaf nodes of the node 2.

Similarly, the value K11 of the node 4 may be substituted into the first one-way hash function h1 ( ) to calculate a derived value K111 (also referred as a derived key) for a left child node 8 of the node 4, and the value K11 of the node 4 may also be substituted into the second one-way hash function h2 ( ) to calculate a derived value K112 for a right child node 9 of the node 4. In other words, the node 4 may be a root node of the nodes 8 and 9, and the nodes 8 and 9 may be leaf nodes of the node 4. The derived value K111 may be utilized to produce a certificate Cert1, and the derived value K112 may be utilized to produce a certificate Cert2. The generation of other certificates Cert 3 to Cert 8 may be similar to the generation of the certificate Cert1 and Cert2 and thus, will not be repeated hereinafter. The certificate Cert1 may include a derived key (K111), a node index 8, a public key, and a signature of the certificate management device 1. In view of the above one or more embodiments, it is difficult to derive the original private value K from the derived key.

Figure 3:
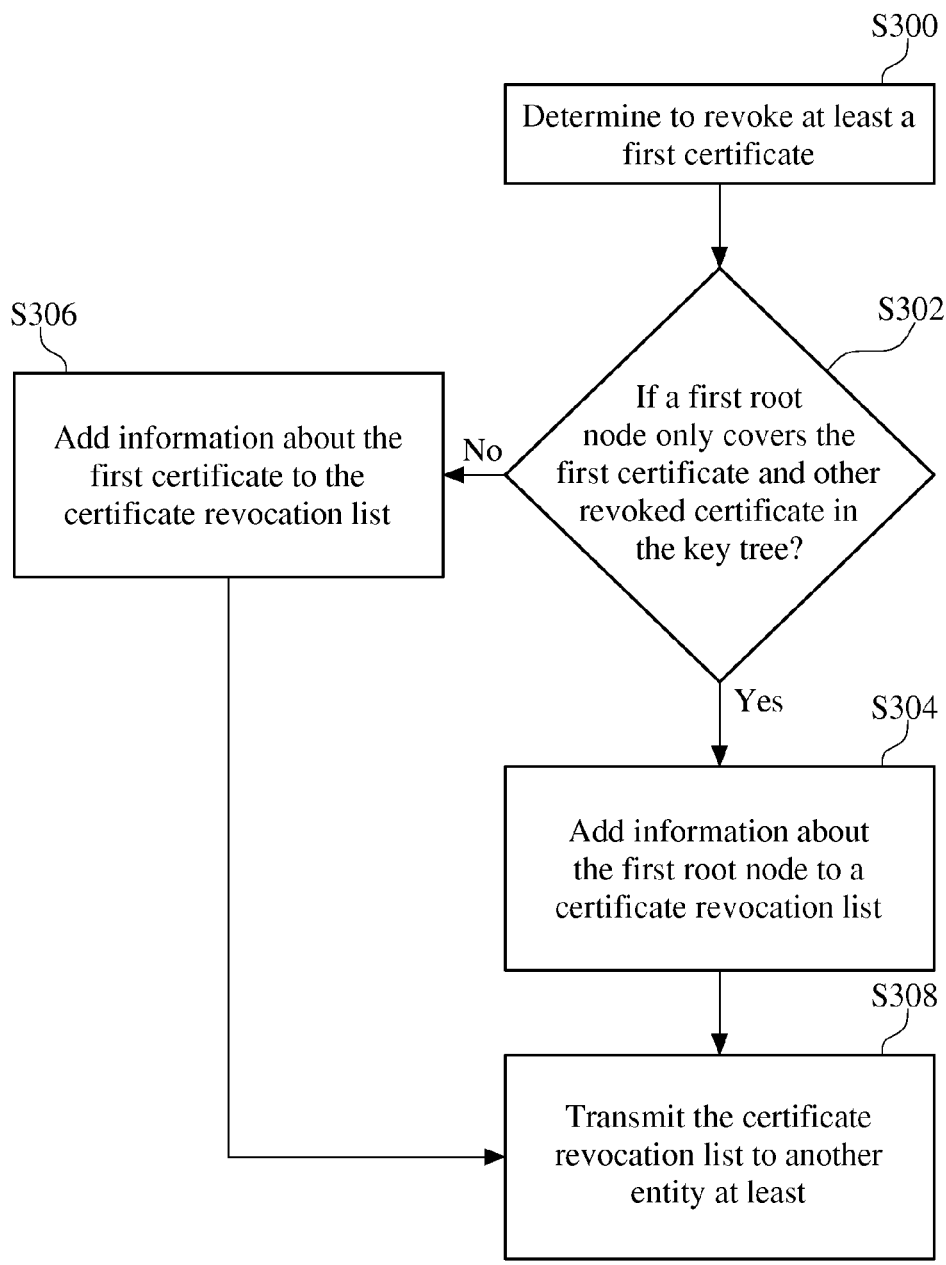
FIG. 3 is a flow chart of a certificate management method according to an embodiment of the disclosure.

Following the description about the exemplary producing of the key tree and certificates, the exemplary embodiment for the certificate management will be described hereinafter by referring FIG. 1 and FIG. 3. FIG. 3 is a flow chart of a certificate management method according to an embodiment of the disclosure. As shown in step S300, the certificate management device 1 may receive a certificate revocation request to revoke a first certificate such as the certificate Cert 1 shown in FIG. 2. The first certificate may be recorded in the key tree in FIG. 2. All certificates in the key tree may be associated with an entity, e.g. an on-board unit (OBU) in a vehicle. In practice, one or more unrevoked certificates (i.e. the at least one first certificate) may be revoked once.

Then, as shown in step S302, the certificate revocation unit 102 may determine whether a root node exists in the key tree, where the root node may only cover the first certificate and other one or more revoked certificates.

For example, while the certificate to be revoked is the certificate Cert 1 in FIG. 2 and the certificate Cert 2 has been revoked, the certificate Cert 3 may still be a valid certificate. Herein, the root node may be the node 4.

For example, while the certificate to be revoked is the certificate Cert 1 in FIG. 2 and the certificates Cert 2 to Cert 4 have been revoked, the certificate Cert 5 is still valid. Herein, the root node may be the node 2. In this case, maybe the node 4 seems to match the definition of the root node, i.e.

only covering the first certificate and other revoked certificates. However, the certificate revocation unit 102 may select the node capable of covering the most root node levels and set it as a root node. While the node 2 may covers two root node levels, the node 4 may cover one root node level. Even if the nodes 2 and 4 may match the definition of the root node, the certificate revocation unit 102 may select the node 2.

Next, as shown in step S304, if the first root node only covers the first certificate and other one or more revoked certificates, the certificate revocation unit 102 may add the information about the first root node into the certificate revocation list. In contrast, as shown in step S306, if the certificate revocation unit 102 can find out any suitable root node in the key tree, the first certificate to be revoked may be recorded into the certificate revocation list. Finally, as shown in step S308, the certificate revocation list broadcast unit 104 may send the certificate revocation list to at least another entity after receiving the certificate revocation list.

For example, after the suitable root node 2 is selected, the certificate revocation unit 102 may record the information, such as the node index (2), the derived key (K1), and the root node level (2), into the certificate revocation list. Even if the certificate revocation list records the derived key (K1), the private value K will not be able to be deduced from the derived key (K1), thereby preventing the reveling of the private value (K) and meanwhile maintaining the confidentiality of the original entity's identification.

On the other hand, after the another entity receives this new certificate revocation list, the another entity may substitute the derived key (K1) into the first one-way hash function h1 ( ) and the second one-way hash function h2 ( ) respectively and then determine four children certificates with respect to the root node level (2). Therefore, another entity may know the location of the derived key (K1) in the key tree according to the node index (2) and then produce the certificates Cert 1 to Cert 4.

Accordingly, it is unnecessary for the certificate revocation list to record all revoked certificates. Rather, since the certificate revocation list suitably provides some information about the root node, another entity may be able to recover all revoked certificates after receiving the certificate revocation list. In this way, the quantity of data of the certificate revocation list may be reduced efficiently.

Figure 4:
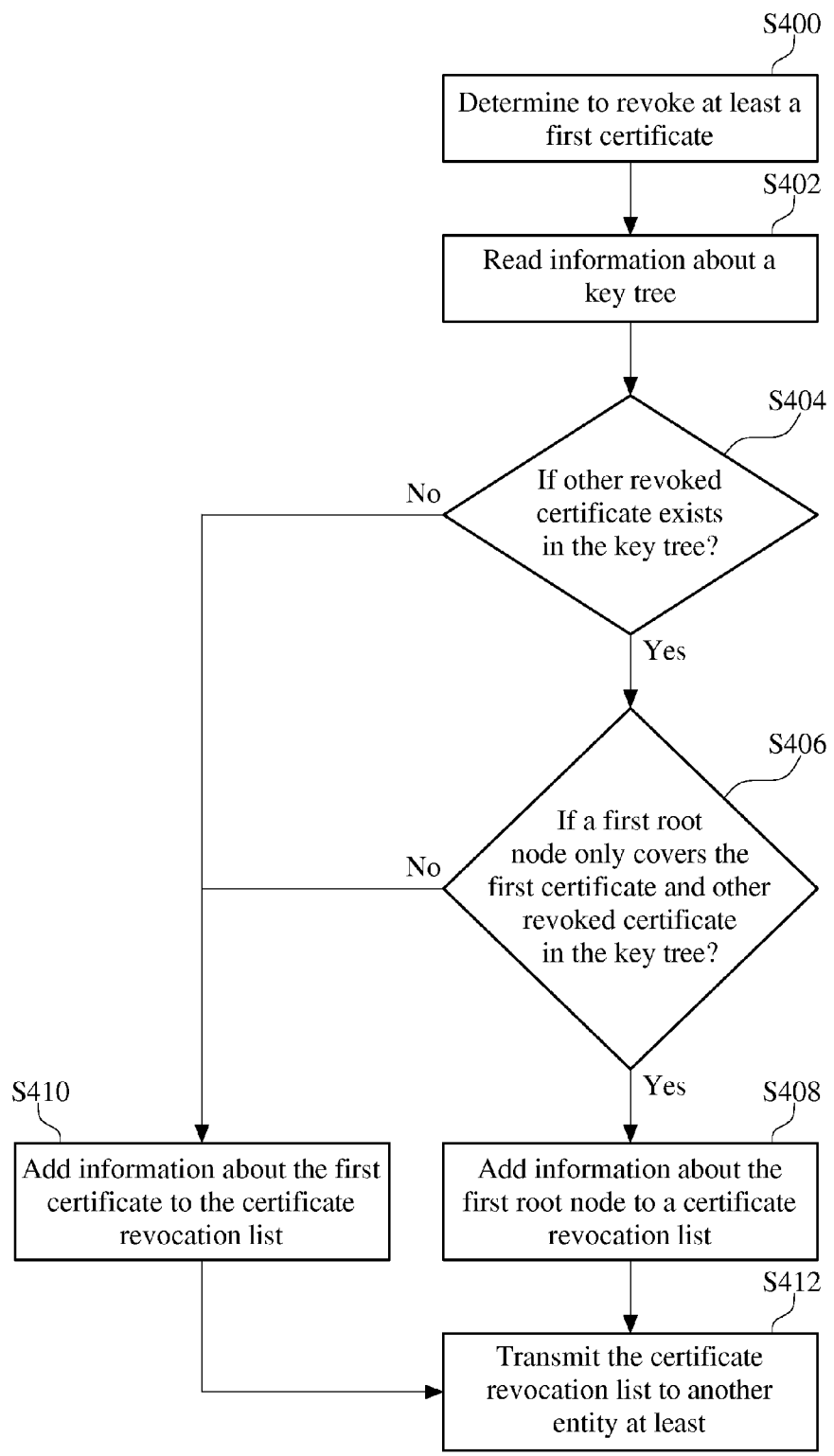
FIG. 4 is a flow chart of a certificate management method according to another embodiment of the disclosure.

In the following one or more embodiments, another certificate management method may further determine whether to collect certificates, as shown in FIG. 1 and FIG. 4. FIG. 4 is a flow chart of a certificate management method according to another embodiment of the disclosure. Similar to the embodiment illustrated in FIG. 3, in step S400, when receiving a certificate revocation request for the first certificate (e.g. the certificate Cert 1 in FIG. 2), the certificate management device 1 may determine to revoke the first certificate. Then, as shown in step S402, the certificate management device 1 may read information about the key tree shown in FIG. 2. Next, as shown in step S404, the certificate management device 1 may check whether there is other revoked certificate in the key tree.

If there is not other revoked certificate, the certificate revocation unit 102 may not need to collect other one or more certificates and may directly add the revocation information about the certificate Cert 1 into the certificate revocation list, as shown in step S410. Otherwise, if there is other revoked certificate in the key tree, the certificate management device 1 may determine whether the first root node only covers the first certificate (i.e. the certificate Cert 1) and other revoked certificate, as shown in step S406.

Take an exemplary embodiment to illustrate step S406. The certificates Cert 2 to Cert 4 in FIG. 2 have been revoked, and the node 2 only covers the certificate Cert 1 and the revoked certificates Cert 2 to Cert 4. Since the certificate Cert 5 is not a revoked certificate and the node 1 covers not only the certificate Cert 1 and the revoked certificates Cert 2 to Cert 4 but also the unrevoked certificate Cert 5, the node 1 will not be regarded as the first root node. In another exemplary embodiment, if the certificates Cert 2 to Cert 8 are the certificates to be revoked, the node 1 may be selected and regarded as the first root node.

On the other hand, if the certificate Cert 2 in FIG. 2 is unrevoked certificate, the certificate management device 1 may not obtain any root node only covering the certificate Cert 1 and other revoked certificate in the key tree such that the certificate revocation unit 102 may directly add the revocation information about the certificate Cert 1 into the certificate revocation list, as shown in step S410.

In addition, as shown in step S408, if a root node only covering the certificate Cert 1 and other one or more revoked certificates is successfully obtained, the information about the first root node may be added into the certificate revocation list, as described in FIG. 3. Finally, as shown in step S412, the certificate revocation list broadcast unit 104 may send the certificate revocation list to at least another entity after receiving the certificate revocation list.

What is claimed is:

1. A certificate management method, performed on a processor and a non-volatile memory, the certificate management method comprising: identifying a first certificate to be revoked from a plurality of certificates recorded in a key tree and related to an entity; finding a first root node of root nodes in the key tree that covers the most revoked certificates along with the first certificate but does not cover any valid certificates; adding information about the first root node of the root nodes along with the information about the first certificate to a certificate revocation list, wherein when the information about the first root node of the root nodes is added along with the information about the first certificate to the certificate revocation list, the certificate revocation list records the information about the first root node of the root nodes, and the information about the first root node includes a node index, a derived key, and a root node hierarchy; and transmitting the certificate revocation list to another entity.

2. The certificate management method according to claim 1, wherein the node index is related to a number of the first root node of the root nodes in the keytree.

3. The certificate management method according to claim 1, wherein the derived key is related to a public key corresponding to the first root node of the root nodes.

4. The certificate management method according to claim 1, wherein the root node hierarchy is related to a derivation path corresponding to the first root node of the root nodes.

5. The certificate management method according to claim 1, wherein the step of finding the first root node of the root nodes in the key tree that covers the most revoked certificates along with the first certificate but does not cover any valid certificates comprises choosing the first root node of the root nodes which has the largest root node hierarchy.

6. The certificate management method according to claim 1, further comprising: finding another revoked certificate exists in the key tree before the step of finding a first root node of the root nodes in the key tree that covers the most revoked certificates along with the first certificate but does not cover any valid certificates is performed.

7. A certificate management device for updating a certification revocation list, comprising: a key collection computing processor for maintaining a key tree that records certificates related to an entity; a certificate revocation processor coupled to the key collection computing processor that: identifying a first certificate to be revoked from a plurality of certificates recorded in a key tree and related to an entity; finding a first root node of root nodes in the key tree that covers the most revoked certificates along with the first certificate but does not cover any valid certificates; and adding information about the first root node of the root nodes along with the information about the first certificate to a certificate revocation list, wherein the certificate revocation list records the information about the first root node of the root nodes, and the information about the first root node of the root node comprises a node index, a derived key, and a root node hierarchy; and a certificate revocation list broadcast processor coupled to the certificate revocation processor that transmits the certification revocation list to another entity.

8. The certificate management device according to claim 7, wherein the node index is related to a number of the first root node of the root nodes in the key tree.

9. The certificate management device according to claim 7, wherein the derived key is related to a public key corresponding to the first root node of the root nodes.

10. The certificate management device according to claim 7, wherein the root node hierarchy is related to a derivation path corresponding to the first root node of the root nodes.

11. The certificate management device according to claim 7, wherein the certificate revocation processor chooses the first root node of the root nodes in which has the largest root node hierarchy when the certificate revocation processor finds the first root node of the root nodes in the key tree that covers the most revoked certificates along with the first certificate but does not cover any valid certificates.

12. The certificate management device according to claim 7, wherein the certificate revocation processor further determines whether another revoked certificate exists in the key tree before the certificate revocation processor finds the first root node of the root nodes in the key tree that covers the most revoked certificates along with the first certificate but does not cover any valid certificates.

* * * * *